(12) United States Patent
Li et al.

(10) Patent No.: US 12,547,056 B2
(45) Date of Patent: Feb. 10, 2026

(54) BRACKET, CAMERA MODULE HAVING THE BRACKET, AND ELECTRONIC DEVICE HAVING THE CAMERA MODULE

(71) Applicant: TRIPLE WIN TECHNOLOGY(SHENZHEN) CO.LTD., Shenzhen (CN)

(72) Inventors: Shuai-Peng Li, Shenzhen (CN); Jing-Wei Li, Guangdong (CN); Shin-Wen Chen, New Taipei (TW)

(73) Assignee: TRIPLE WIN TECHNOLOGY(SHENZHEN) CO.LTD., Shenzhen (CN)

( * ) Notice: Subject to any disclaimer, the term of this patent is extended or adjusted under 35 U.S.C. 154(b) by 121 days.

(21) Appl. No.: 18/504,512

(22) Filed: Nov. 8, 2023

(65) Prior Publication Data

US 2025/0044669 A1 Feb. 6, 2025

(30) Foreign Application Priority Data

Jul. 31, 2023 (CN) .......................... 202310955160.0

(51) Int. Cl.
*G03B 17/56* (2021.01)
(52) U.S. Cl.
CPC .................. *G03B 17/561* (2013.01)
(58) Field of Classification Search
None
See application file for complete search history.

(56) References Cited

U.S. PATENT DOCUMENTS

| | | | | |
|---|---|---|---|---|
| 8,553,131 | B2 * | 10/2013 | Tseng | G02B 27/62 |
| | | | | 348/340 |
| 11,543,568 | B2 * | 1/2023 | Song | H04N 23/54 |
| 2014/0293558 | A1 * | 10/2014 | Lim | H05K 1/0215 |
| | | | | 29/829 |
| 2020/0004012 | A1 * | 1/2020 | Li | H05K 1/181 |
| 2021/0109422 | A1 * | 4/2021 | Chen | G03B 17/08 |
| 2021/0168939 | A1 * | 6/2021 | Li | G02B 7/02 |
| 2023/0128696 | A1 * | 4/2023 | Li | G02B 7/02 |
| | | | | 361/749 |

FOREIGN PATENT DOCUMENTS

| | | | | |
|---|---|---|---|---|
| CN | 104238064 | A | | 12/2014 |
| CN | 106791309 | A | | 5/2017 |
| CN | 212649566 | U | * 3/2021 | .......... G02B 13/001 |
| CN | 112738375 | A | | 4/2021 |
| CN | 115314623 | A | | 11/2022 |
| CN | 107395932 | B | | 4/2023 |
| TW | 202122899 | A | | 6/2021 |

* cited by examiner

*Primary Examiner* — Rodney E Fuller
(74) *Attorney, Agent, or Firm* — ScienBiziP, P.C.

(57) ABSTRACT

A bracket includes a bearing plate and multiple supporting plates, the multiple supporting plates being disposed around one side of the bearing plate to form a support space, the bearing plate being penetrated with a first aperture and multiple second apertures, the first aperture is staggered from each of the second apertures, the first aperture and the second apertures communicating with the support space. The bracket provided by the present disclosure is beneficial to reducing the height of the camera module. In addition, the present disclosure also provides a camera module and an electronic device.

17 Claims, 9 Drawing Sheets

BRACKET, CAMERA MODULE HAVING THE BRACKET, AND ELECTRONIC DEVICE HAVING THE CAMERA MODULE

FIELD

The subject matter herein generally relates to imaging, and more particularly, to a bracket, a camera module having the bracket, and an electronic device having the camera module.

BACKGROUND

A camera module generally includes a circuit board, a bracket, and a lens assembly. The bracket is positioned between the lens assembly and the circuit board.

However, the existing lens assembly may have a short back focal length, while the bracket is designed to be thick to meet structural strength requirements, resulting in a mismatch between the lens assembly and the bracket. The thick bracket also limits the application of the camera module in a miniatured electronic device.

BRIEF DESCRIPTION OF THE DRAWINGS

Implementations of the present technology will now be described, by way of example only, with reference to the attached figures.

DETAILED DESCRIPTION

It will be appreciated that for simplicity and clarity of illustration, where appropriate, reference numerals have been repeated among the different figures to indicate corresponding or analogous members. In addition, numerous specific details are set forth in order to provide a thorough understanding of the embodiments described herein. However, it will be understood by those of ordinary skill in the art that the embodiments described herein can be practiced without these specific details. In other instances, methods, procedures, and members have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

The term "comprising," when utilized, means "including, but not necessarily limited to;" it specifically indicates open-ended inclusion or membership in the so-described combination, group, series, and the like.

Figure 1:
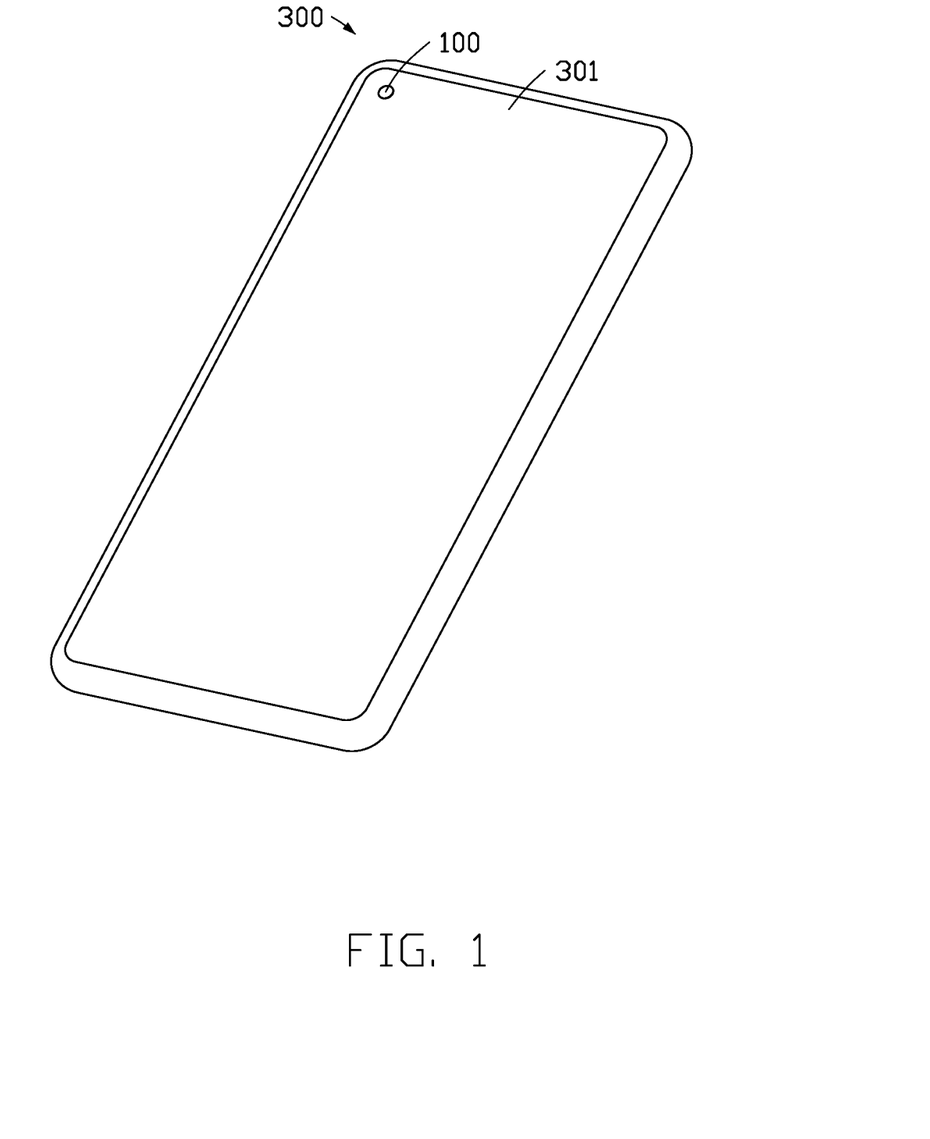
FIG. 1 is a diagrammatic view of an electronic device according to an embodiment of the present disclosure.

Referring to FIG. 1, an electronic device 300 is provided according to an embodiment of the present disclosure. The electronic device 300 may be a digital camera, a mobile phone, a security device, a robot, a car-mounted system, an optical measurement device, a medical device, and other electronic devices with camera functionalities. For illustration purposes, this embodiment will be described using a mobile phone as an example.

The electronic device 300 includes an outer shell 301 and a camera module 100. The camera module 100 is exposed from the outer shell 301, and can be a front camera, a rear camera, or a rotatable camera.

Figure 2:
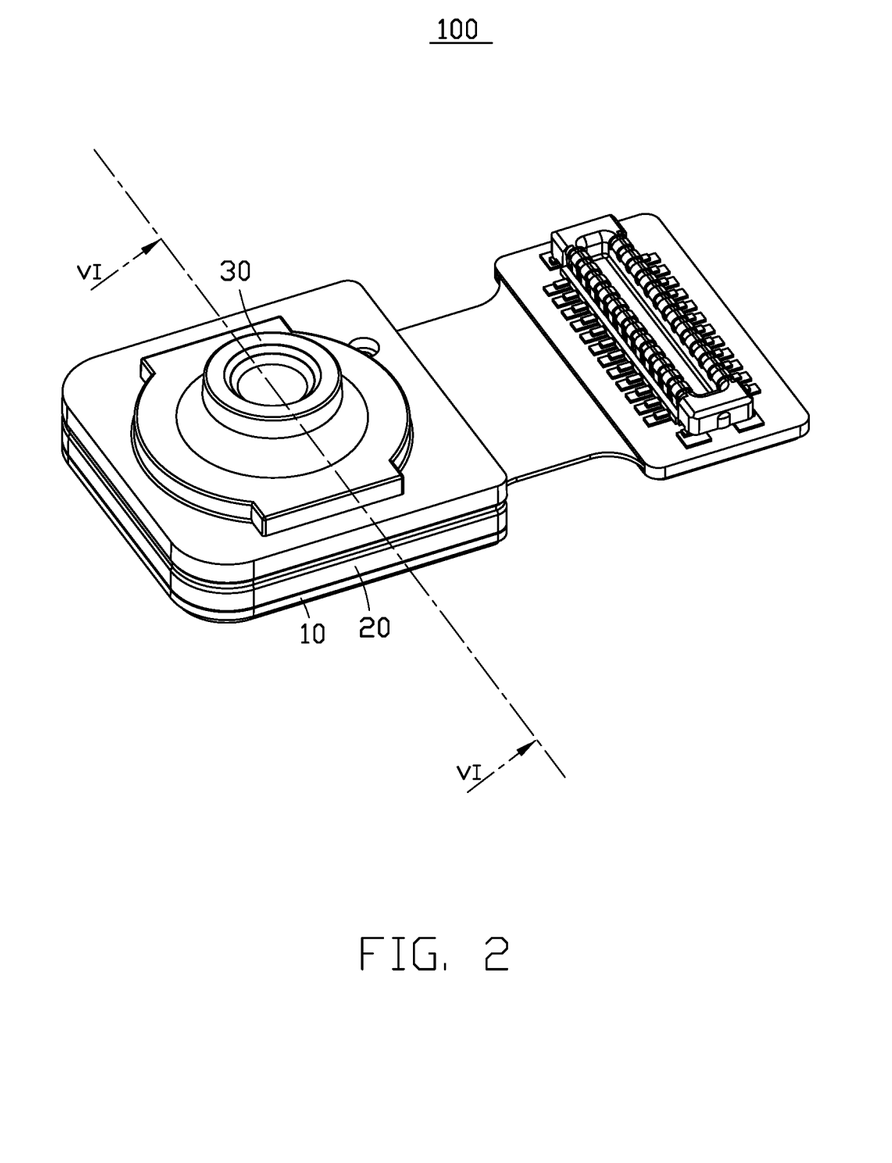
FIG. 2 is a diagrammatic view of a camera module of the electronic device in FIG. 1.
Figure 3:
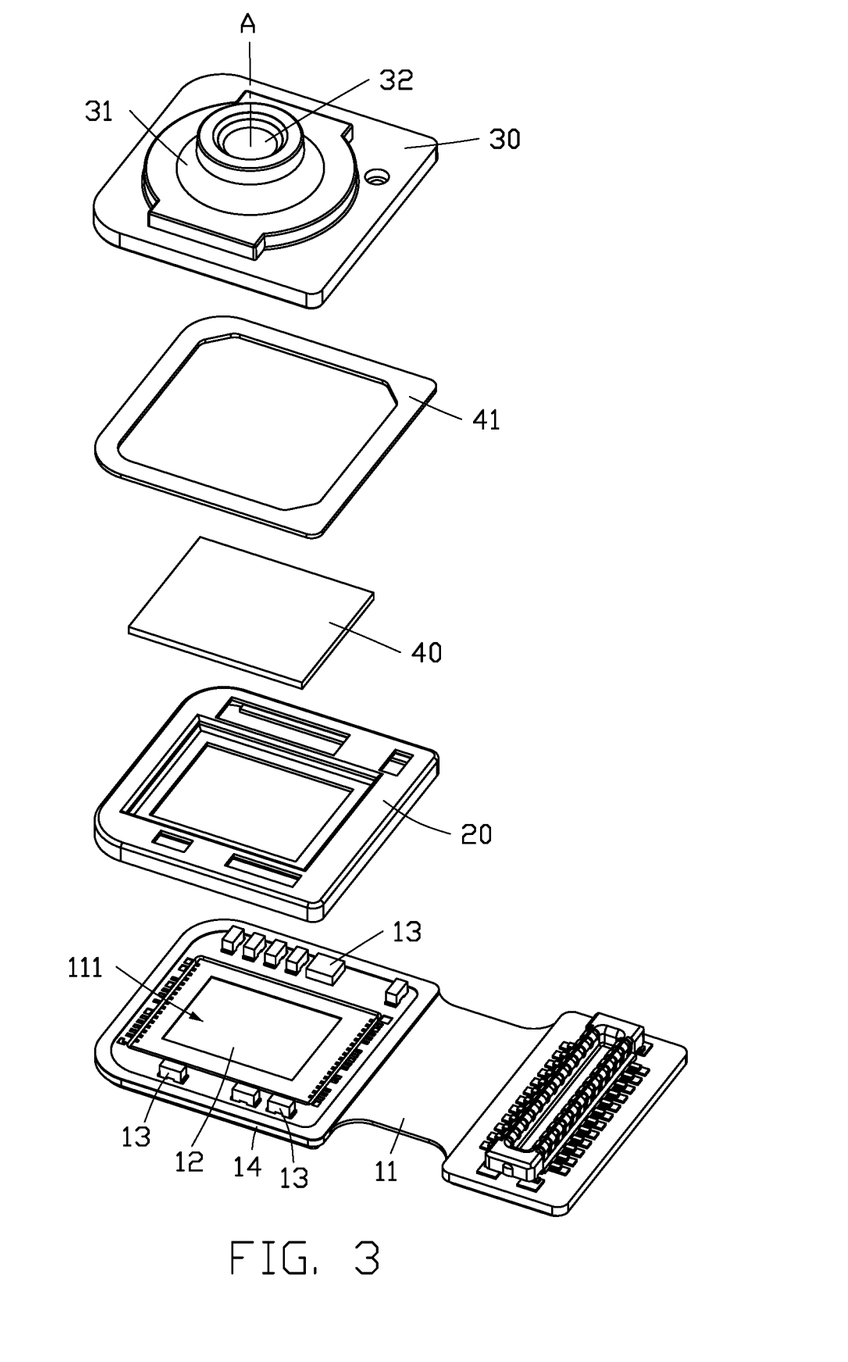
FIG. 3 is an exploded view of the camera module in FIG. 2.

Referring to FIGS. 2 and 3, the camera module 100 includes a circuit board assembly 10, a bracket 20, and a lens assembly 30. The bracket 20 is positioned between the circuit board assembly 10 and the lens assembly 30.

Figure 6:
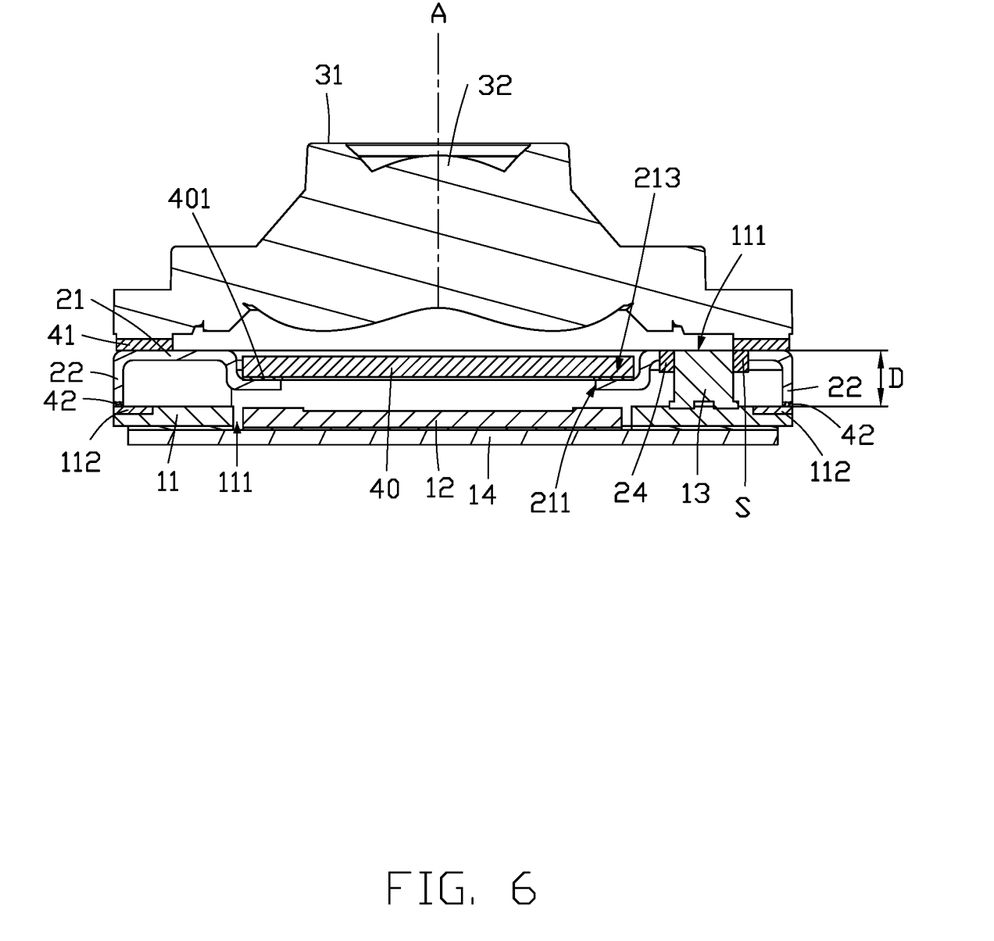
FIG. 6 is a cross-sectional view along VI-VI of the camera module in FIG. 2.

Referring to FIGS. 3 and 6, the circuit board assembly 10 includes a circuit board 11, an image sensor 12, and a plurality of electronic components 13. The image sensor 12 and the electronic components 13 are mounted on the circuit board 11. The bracket 20 is positioned on the circuit board 11, and covers the image sensor 12 and the electronic components 13. The lens assembly 30 includes a lens barrel 31 and a plurality of lenses 32. The lenses 32 are positioned inside the lens barrel 31, and the central axis of the lens barrel 31 is aligned with the optical axis A of the lenses 32. The lens barrel 31 is positioned on a side of the bracket 20 away from the circuit board 11.

The circuit board assembly 10 also includes a reinforcement plate 14. The circuit board 11 defines a mounting hole 111. The reinforcement plate 14 is positioned on a side of the circuit board 11 away from the electronic components 13, and covers the mounting hole 111. The image sensor 12 is disposed within the mounting hole 111 and electrically connected to the circuit board 11.

When in use, the lenses 32 converge light rays reflected from an object and form imaging signals, and the image sensor 12 captures the imaging signals, and processes and converts the imaging signals into digital signals. Finally, the digital signals are transmitted through the circuit board 11 to other components (e.g., a control mainboard) of the electronic device 300.

Figure 4:
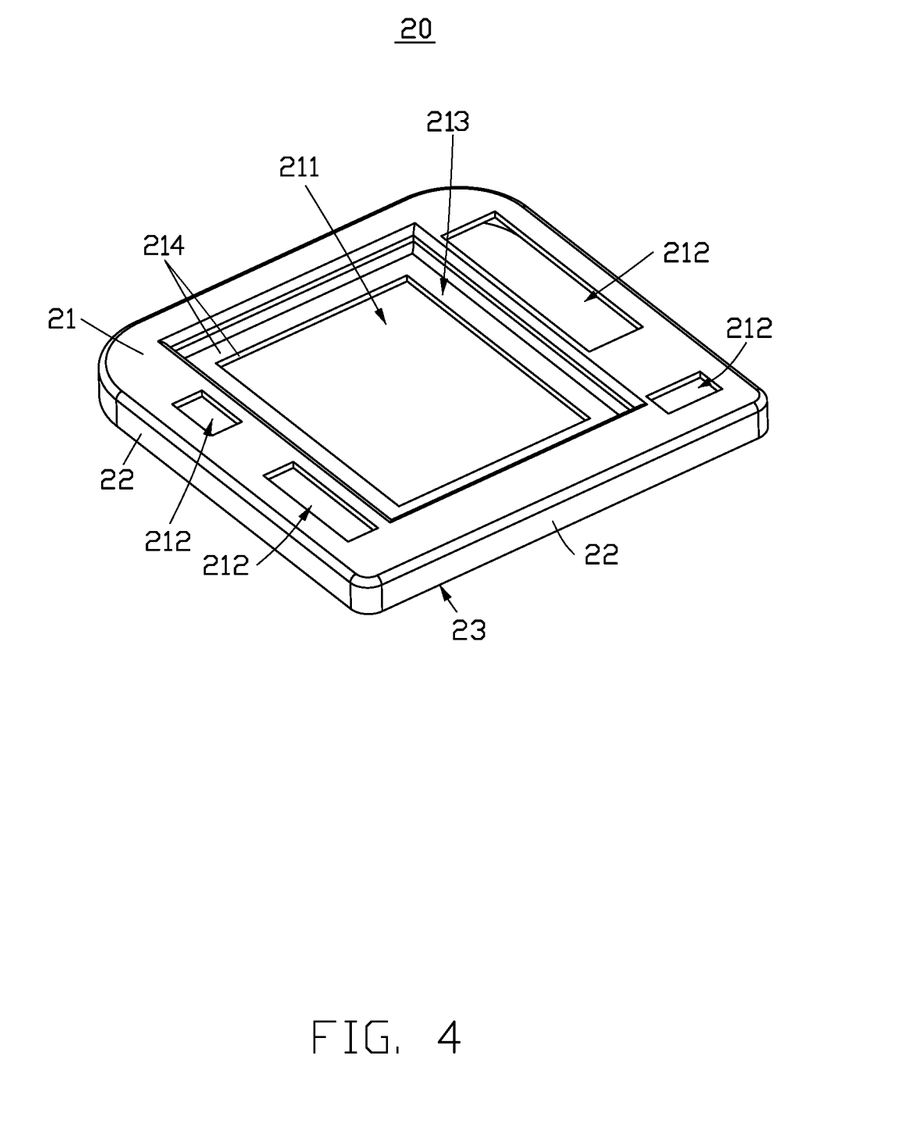
FIG. 4 is a diagrammatic view of a bracket of the camera module in FIG. 3.
Figure 5:
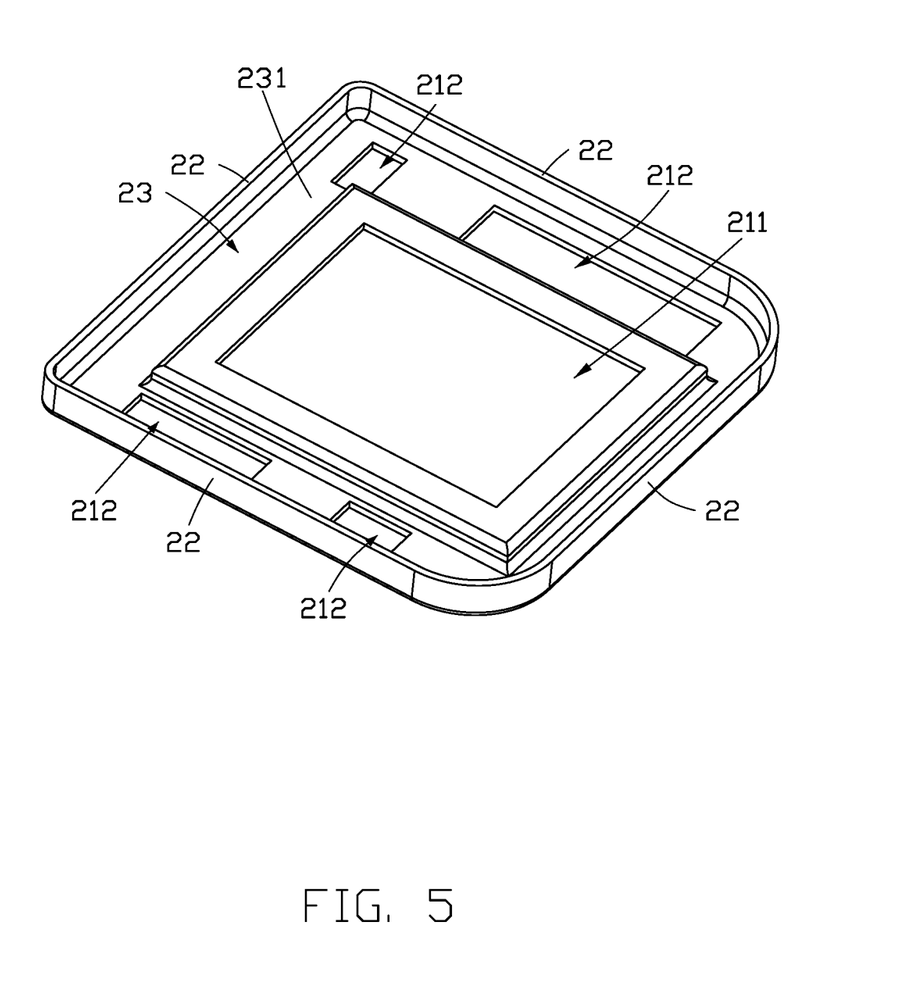
FIG. 5 is similar to FIG. 4 but showing the bracket from another angle.

Referring to FIGS. 4 and 5, the bracket 20 includes a bearing plate 21 and four supporting plates 22. The four supporting plates 22 surround a periphery of the bearing plate 21, and cooperatively define a support space 23. The image sensor 12 and the electronic components 13 are all accommodated within the support space 23.

The bearing plate 21 defines a first aperture 211 and a plurality of second apertures 212. The first aperture 211 and the second apertures 212 are staggered with other and are communicated with the support space 23. A side of the first aperture 211 corresponds to the image sensor 12, and another side of the first aperture 211 corresponds to the lens assembly 30, allowing the light rays to pass through the first aperture 211 and reach the image sensor 12. The second apertures 212 correspond to the electronic components 13 and are positioned on a side away from the circuit board 11, the second apertures 212 can receive the electronic components 13. The electronic components 13 may be active components or passive components. The active components include driver chips, and the passive components include resistors, capacitors, inductors, and the like.

By defining the second apertures 212 in the bracket 20 for receiving the electronic components 13, the present disclosure prevents the bracket 20 from interfering with the electronic components 13. Furthermore, the overall height of the bracket 20 can be reduced, which allowing the bracket 20 to be used in a miniatured camera module 100.

Referring to FIG. 6, in this embodiment, a gap S is formed between the sidewall of each the electronic component 13 and the inner circumferential wall of the corresponding second aperture 212. The gap S is filled with a colloid 24, thereby enhancing the stability of the electronic components 13 and improving the connection strength between the bracket 20 and the circuit board 11.

In this embodiment, the bracket 20 is formed as a single-piece structure, and both the bearing plate 21 and the supporting plates 22 are made of metal. Along a direction of the optical axis A, the bracket 20 has a height D ranging from 0.5 to 1 millimeter. The first aperture 211 and the second apertures 212 are formed by mechanically punching. The material of the bracket 20 can be aluminum alloy, steel, copper alloy, or other hard alloys. The metallic bracket 20 provides an increased strength and stiffness compared to bracket made of plastic or metal-plastic composite materials, and the bracket 20 exhibits better thermal conductivity for effective heat dissipation.

In this embodiment, the central region of the bearing plate 21 is recessed toward the support space 23 to form a receiving groove 213. The first aperture 211 penetrates the bottom surface of the receiving groove 213. The second apertures 212 are disposed around the receiving groove 213. The camera module 100 further includes a filter 40, the filter 40 is disposed at a bottom of the receiving groove 213 and covers the first aperture 211. Thus, the light rays can pass through the filter 40 and be filtered by the filter 40 before being received by the imagine sensor 12. Wherein, the filter 40 is fixed to the bottom surface of the receiving groove 213 through a first adhesive layer 401, thereby improving the stability of the filter 40 when the camera is vibrated or titled. The filter 40 can effectively remove the light rays that the imagine sensor 12 is not sensitive to, and improve the color quality of images.

Referring to FIGS. 4 and 5, in this embodiment, a first anti-reflective layer 231 is disposed on a side of the plurality of supporting plates 22 facing the support space 23 and on a side of the bearing plate 21 facing the support space 23. A second anti-reflective layer 214 is disposed on an inner surface of the receiving groove 213 (including the bottom surface and the inner wall of the receiving groove 213) and the inner wall of the first aperture 211. Wherein, the first anti-reflective layer 231 and the second anti-reflective layer 214 both include a black oxidized layer with multiple microporous structures. When the light rays reach the first anti-reflective layer 231 and the second anti-reflective layer 214, the multiple microporous structures act like a "blackbody" to absorb the light rays, thereby reducing the reflection of the light rays on the bracket 20, which is beneficial to reduce stray light and improves the imaging quality of the camera module 100. In at least one embodiment, the first anti-reflective layer 231 and the second anti-reflective layer 214 are both formed by anodic oxidation.

Referring to FIG. 6, in this embodiment, the lens barrel 31 is connected to the bearing plate 21 through a second adhesive layer 41. The supporting plates 22 and the circuit board 11 are connected through a soldering layer 42. The circuit board 11 is also provided with a plurality of grounding pads 112, and the grounding pads 112 can be connected to ground lines of the circuit board 11, so that the bracket 20 can serve as an electromagnetic shielding housing to provide electromagnetic shielding for the imagine sensor 12 and the plurality of electronic components 13.

Figure 7:
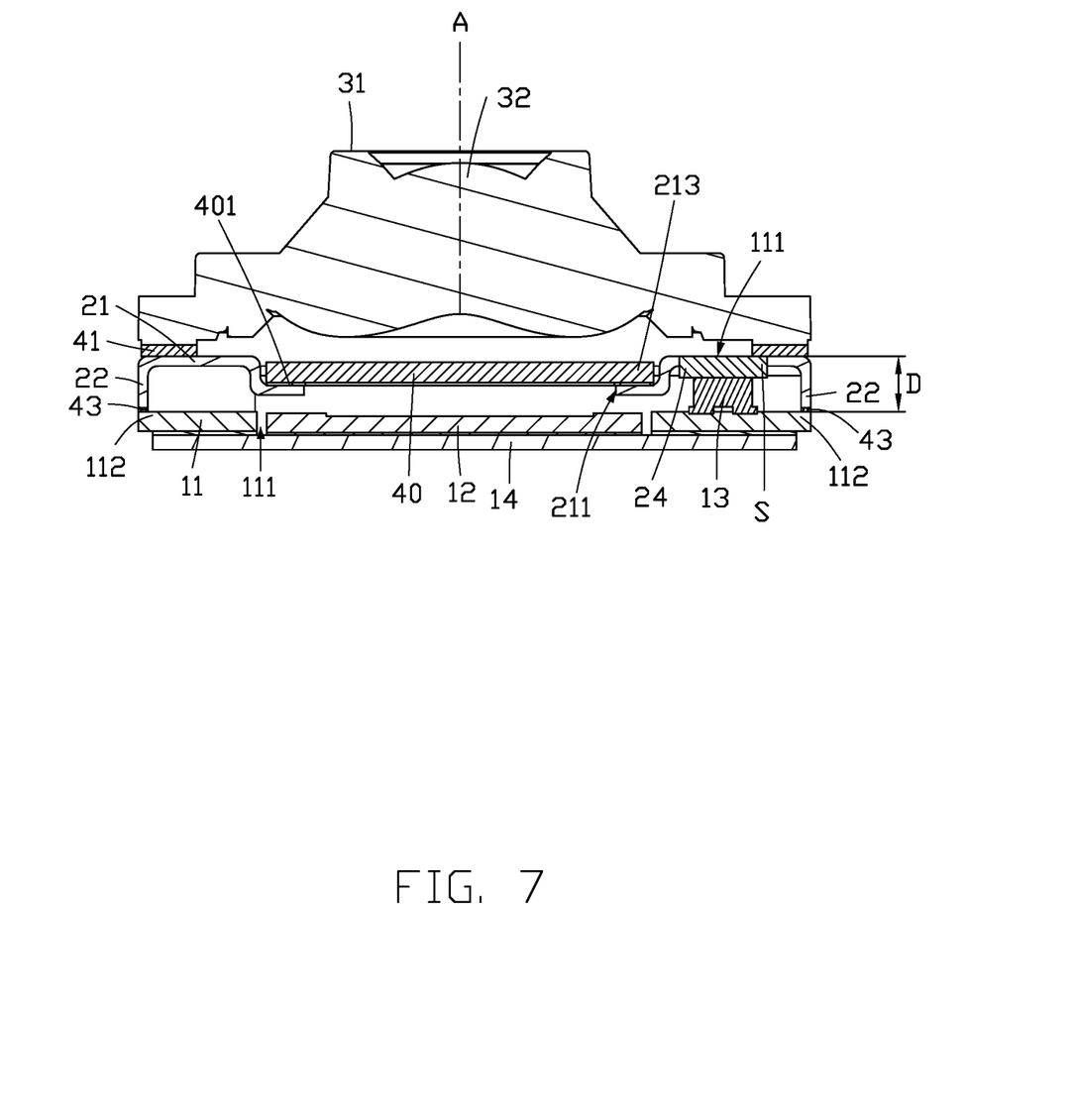
FIG. 7 is a cross-sectional view of a camera module according to another embodiment of the present disclosure.

Referring to FIG. 7, a camera module 100' is provided according to another embodiment of the present disclosure. The supporting plates 22 are connected to the circuit board 11 by a thermal conductive adhesive 43, thereby ensuring both a stable connection and an efficient heat conduction from the circuit board 11 to the bracket 20.

Figure 8:
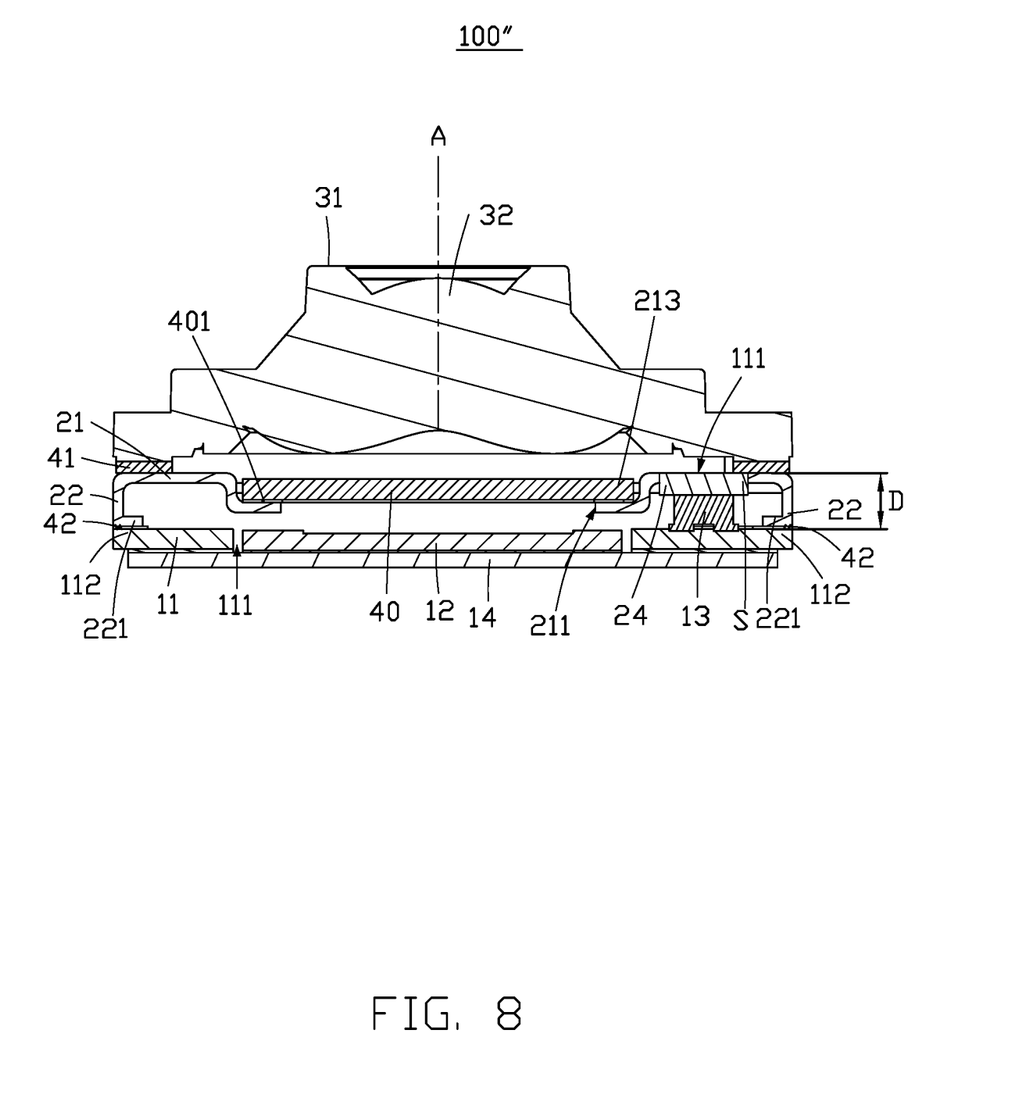
FIG. 8 is a cross-sectional view of a camera module according to yet another embodiment of the present disclosure.

Referring to FIG. 8, a camera module 100" is provided according to yet another embodiment of the present disclosure. An end of the supporting plates 22 away from the bearing plate 21 is bent toward the support space 23, thereby creating a first bent portion 221. The first bent portion 221 increases the bonding area between the bracket 20 and the circuit board 11, thereby enhancing the connection strength between the bracket 20 and the circuit board 11 and further reducing the height D of the bracket 20.

Figure 9:
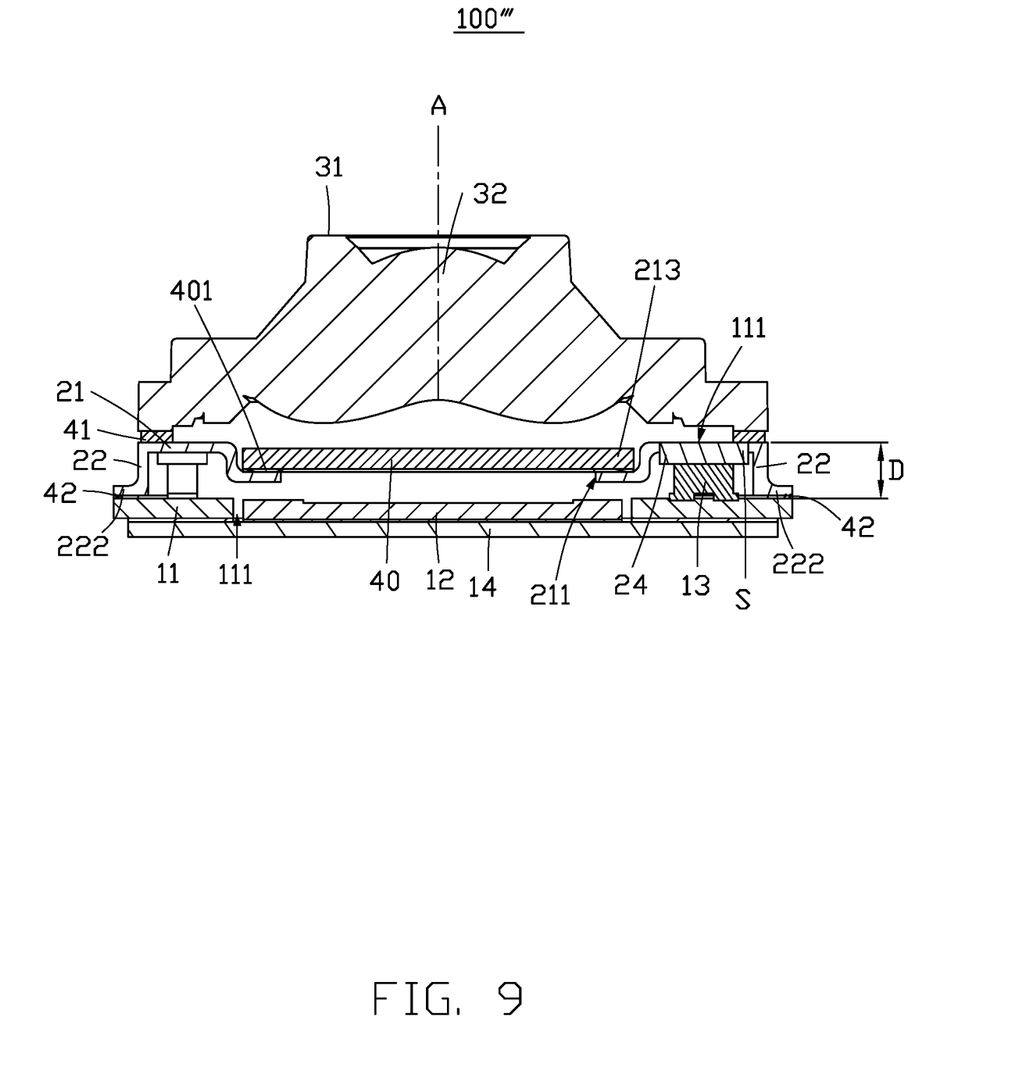
FIG. 9 is a cross-sectional view of a camera module according to yet another embodiment of the present disclosure.

Referring to FIG. 9, a camera module 100''' is provided according to yet another embodiment of the present disclosure. The end of the supporting plates 22 away from the bearing plate 21 is bent away from the support space 23, thereby creating a second bent portion 222. The second bent portion 222 also increases the bonding area between the bracket 20 and the circuit board 11, enhances the connection strength between the bracket 20 and the circuit board 11, and further reduces the height D of the bracket 20.

The provided embodiments illustrate different structural configurations of the camera module and the bracket, each contributing to the reduction of overall height and improvement of performance. These designs facilitate miniaturization and enhance the imaging quality of the camera module.

Even though information and advantages of the present embodiments have been set forth in the foregoing description, together with details of the structures and functions of the present embodiments, the disclosure is illustrative only. Changes may be made in detail, especially in matters of shape, size, and arrangement of parts within the principles of the present exemplary embodiments, to the full extent indicated by the plain meaning of the terms in which the appended claims are expressed.

What is claimed is:

1. A bracket comprising:
   a bearing plate; and
   a plurality of supporting plates surrounding an edge of the bearing plate, the bearing plate and the plurality of supporting plates cooperatively forming a support space,
   wherein the bearing plate defines a first aperture and a plurality of second apertures, each of the first aperture and the plurality of second apertures is communicated with the support space;
   wherein the bracket further comprises a plurality of bent portions, each of the plurality of bent portions is connected to one end of a corresponding one the plurality of supporting plates away from the bearing plate, and the plurality of bent portions is bent towards the support space or away from the support space.

2. The bracket of claim 1, wherein the bearing plate is recessed towards the support space to form a receiving groove, the first aperture penetrates a bottom surface of the receiving groove, and the plurality of second apertures surrounds a periphery of the receiving groove.

3. The bracket of claim 2, further comprising an anti-reflective layer, wherein the anti-reflective layer is formed on one side of the plurality of supporting plates facing the support space and one side of the bearing plate facing the support space, and the anti-reflective layer is further formed on an inner surface of the receiving groove and an inner wall of the first aperture.

4. The bracket of claim 1, wherein the bearing plate and the plurality of supporting plates are made of metal.

5. The bracket of claim 1, wherein the bearing plate and the plurality of supporting plates are integrally formed.

6. A camera module, comprising:
a circuit board assembly comprising:
a circuit board;
a imagine sensor formed on the circuit board; and
a plurality of electronic components formed on the circuit board;
a lens assembly; and
a bracket located between the circuit board assembly and the lens assembly,
wherein the bracket comprises a bearing plate and a plurality of supporting plates surrounding an edge of the bearing plate, the bearing plate and the plurality of supporting plates cooperatively forming a support space, the bearing plate defines a first aperture and a plurality of second apertures, each of the first aperture and the plurality of second apertures is communicated with the support space, and
the imagine sensor faces the first aperture, and at least a portion of the plurality of electronic components extends through the plurality of second apertures;
wherein the bracket further comprises a plurality of bent portions, each of the plurality of bent portions is connected to one end of a corresponding one of the plurality of supporting plates away from the bearing plate, and the plurality of bent portions is bent towards the support space or away from the support space.

7. The camera module of claim 6, wherein the bearing plate is recessed towards the support space to form a receiving groove, the first aperture penetrates a bottom surface of the receiving groove, and the plurality of second apertures surrounds a periphery of the receiving groove.

8. The camera module of claim 7, wherein one side of the plurality of supporting plates facing the support space and one side of the bearing plate facing the support space are provided with anti-reflective layers, and an inner surface of the receiving groove and an inner wall of the first aperture are provided with the anti-reflective layers.

9. The camera module of claim 6, wherein the bearing plate and the plurality of supporting plates are made of metal material.

10. The camera module of claim 6, wherein the bracket is an integral molded structure.

11. The camera module of claim 6, the camera module further comprising a filter, wherein the filter is disposed on the bearing plate, and the filter covers the first aperture.

12. The camera module of claim 6, wherein the circuit board comprises a plurality of grounding pads, the plurality of supporting plates is electrically connected to the plurality of grounding pads.

13. An electronic device, comprising a camera module, the camera module comprising:
a circuit board assembly comprising:
a circuit board;
a imagine sensor formed on the circuit board; and
a plurality of electronic components formed on the circuit board;
a lens assembly; and
a bracket located between the circuit board assembly and the lens assembly,
wherein the bracket comprises a bearing plate and a plurality of supporting plates surrounding an edge of the bearing plate, the bearing plate and the plurality of supporting plates cooperatively forming a support space, the bearing plate defines a first aperture and a plurality of second apertures, each of the first aperture and the plurality of second apertures is communicated with the support space, and
the imagine sensor faces the first aperture, and at least a portion of the plurality of electronic components extends through the plurality of second apertures;
wherein the bracket further comprises a plurality of bent portions, wherein each of the plurality of bent portions is connected to one end of a corresponding one the plurality of supporting plates away from the bearing plate, and the plurality of bent portions is bent towards the support space or away from the support space.

14. The electronic device of claim 13, wherein the bearing plate is recessed towards the support space to form a receiving groove, the first aperture penetrates a bottom surface of the receiving groove, and the plurality of second apertures surrounds a periphery of the receiving groove.

15. The electronic device of claim 13, wherein the bracket further comprises an anti-reflective layer, wherein the anti-reflective layer is formed on one side of the plurality of supporting plates facing the support space and one side of the bearing plate facing the support space, and the anti-reflective layer is further formed on an inner surface of the receiving groove and an inner wall of the first aperture.

16. The electronic device of claim 13, wherein the bearing plate and the plurality of supporting plates are made of metal.

17. The electronic device of claim 13, wherein the bearing plate and the plurality of supporting plates are integrally formed.

* * * * *